(12) United States Patent
Liu et al.

(10) Patent No.: US 9,946,247 B2
(45) Date of Patent: Apr. 17, 2018

(54) SYSTEM FOR MANAGING REAL-TIME WORK INFORMATION OF A MOTOR FITTING

(71) Applicant: TECO ELECTRIC & MACHINERY CO., LTD., Taipei (TW)

(72) Inventors: Chao-Kai Liu, Taipei (TW); Ji-Hung Kang, Taipei (TW); Hung-Chun Chang, Taipei (TW); Chen-Shun Hung, Taipei (TW); Chun-Hung Chen, Taipei (TW); Chien-Hung Chen, Taipei (TW)

(73) Assignee: Teco Electric & Machinery Co., Ltd., Taipei (TW)

( * ) Notice: Subject to any disclaimer, the term of this patent is extended or adjusted under 35 U.S.C. 154(b) by 333 days.

(21) Appl. No.: 14/837,836

(22) Filed: Aug. 27, 2015

(65) Prior Publication Data
US 2016/0378095 A1 Dec. 29, 2016

(30) Foreign Application Priority Data

Jun. 26, 2015 (TW) .............................. 104120716 A

(51) Int. Cl.
| | |
|---|---|
| G06F 19/00 | (2018.01) |
| G06F 19/26 | (2011.01) |
| G05B 19/406 | (2006.01) |
| G05B 19/19 | (2006.01) |
| H02P 29/04 | (2006.01) |
| H02P 6/08 | (2016.01) |
| H02P 6/182 | (2016.01) |

(52) U.S. Cl.
CPC ........... *G05B 19/406* (2013.01); *G05B 19/19* (2013.01); *B60L 2240/425* (2013.01); *B60L 2240/486* (2013.01); *G05B 2219/39366* (2013.01); *H02P 6/08* (2013.01); *H02P 6/182* (2013.01); *H02P 29/045* (2013.01)

(58) Field of Classification Search
CPC ......... B60L 2240/425; B60L 2240/486; H02P 6/182; H02P 29/045; H02P 6/08
USPC ........................... 700/90, 117, 159, 170, 278
See application file for complete search history.

(56) References Cited

U.S. PATENT DOCUMENTS

| | | | |
|---|---|---|---|
| 5,392,716 A * | 2/1995 | Orschek | B60L 3/12 105/49 |
| 2014/0103849 A1* | 4/2014 | Lalonge | H02K 11/001 318/490 |

* cited by examiner

*Primary Examiner* — Michael J Brown
(74) *Attorney, Agent, or Firm* — Muncy, Geissler, Olds & Lowe, P.C.

(57) ABSTRACT

A system for managing real-time work information of a motor fitting provides a sensor set at the motor fitting to transmit the real-time work information to a processing module. A processing unit of the processing module sends type information and a real-time work parameter according to the real-time work information. When a detection unit determines the real-time work parameter is fallen outside a normal work parameter according to a lookup table stored in a database and the type information, the detection unit generates an abnormal-notification signal for transmission. When an application procedure of the application-processing unit is triggered, the application-processing unit activates a play unit to play the normal work parameter, and further the activated play unit plays notification information upon receiving the abnormal-notification signal.

14 Claims, 12 Drawing Sheets

SYSTEM FOR MANAGING REAL-TIME WORK INFORMATION OF A MOTOR FITTING

This application claims the benefit of Taiwan Patent Application Serial No. 104120716, filed Jun. 26, 2015, the subject matter of which is incorporated herein by reference.

BACKGROUND OF INVENTION

1. Field of the Invention

The invention relates to a system for managing real-time work information of a motor fitting, and more particularly to the system for managing real-time work information of a motor fitting that performs management upon the motor fitting according to the real-time work information thereof.

2. Description of the Prior Art

For years, the motor fitting is always popular as the mainstream product in the electric rotating machinery for its usefulness, sturdiness and endurance, no matter in the manufacturing industries or in the consuming industries. Actually, the use of motor fitting has become the inseparable part to people's daily life. In particular, as the progress of the modern technology, it is widely accepted to monitor work information of the motor fitting by proper detection setup. The typical detection setup is mainly to construct sensors to coils, bearings and/or exterior surfaces of the motor fitting, such that the in-situ work information can be transmitted to be computer-monitored or be printed in a control center. However, since the aforesaid detection setup needs a control panel or a central control room to perform the monitoring of the work information, thus operation states or abrupt changes of the motor fitting can't be captured in a real-time manner. Hence, proper in-time management can be provided to meet these possible emergency events in operating the motor fitting, and the practical usefulness and convenience of the detection setup are greatly reduced.

SUMMARY OF THE INVENTION

In view of aforesaid problems in the art that existing detection setup for monitoring the work information of the motor fitting can't meet some urgent, though occurring seldom, needs, accordingly, it is the primary object of the present invention to provide a system for managing real-time work information of a motor fitting that communicatively couples the real-time work information of the motor fitting to a communication device so as to resolve possible communication delay between the motor fitting and the responsible personnel holding the communication device.

In the present invention, the system for managing real-time work information of a motor fitting includes at least one motor fitting, at least one sensor set, a processing module and a communication device. The sensor set mounted at the motor fitting is to detect real-time work information of the motor fitting so as to transmit a detection signal representing the real-time work information. The processing module communicatively coupled with the sensor set further includes a processing unit, a motor-fitting database and a detection unit. The processing unit for receiving the detection signal is to analyze type information and real-time work information of the motor fitting with respect to the motor fitting, and is further to transmit a first processing signal representing the type information and a second processing signal representing the real-time work parameter, respectively. The motor-fitting database stores at least one motor-fitting lookup table including a mapping relationship between the type information and at least one normal work parameter value of the motor fitting. The detection unit electrically coupled with the processing unit and the motor-fitting database is to receive the first processing signal and the second processing signal so as to base on the type information of the motor fitting and the motor-fitting lookup table to judge if the real-time work parameter is fallen out of the at least one normal work parameter value of the motor fitting. If positive, the detection unit transmits an abnormal-notification signal. The communication device communicatively coupled with the processing module further includes an application-processing unit and a play unit. The application-processing unit further has an application procedure, and the play unit is electrically coupled with the application-processing unit. After the application procedure triggers the application-processing unit to receive the second processing signal, the play unit is thus activated to play the real-time work parameter. After the application procedure triggers the application-processing unit to receive the abnormal-notification signal, the play unit is thus activated to play notification information.

In one embodiment of the present invention, the real-time work parameter is at least one of a voltage, a current, a temperature, a power and a power factor, the processing module is one of a server and a gateway, the communication device is one of a mobile phone, a tablet computer and a notebook computer, and the play unit includes one of an audio-playing mode and an image-playing mode for playing the notification information. In addition, the processing module includes a recording unit electrically coupled with the detection unit and the processing unit. When the detection unit transmits the abnormal-notification signal, the recording unit is activated to record an abnormal event. Also, when the personnel in charge bases on notification information transmitted from the communication device to manage the abnormal event, the recording unit is also activated to record a processed event. Further, the processing unit bases on the real-time work information to analyze site information with respect to the at least one motor fitting. The recording unit stores also the abnormal event, the processed event and the site information into an abnormal-event lookup table.

In one embodiment of the present invention, the type information of the motor fitting is at least one of a rated current, a rated power, a rated voltage and a rated power factor. In addition, the processing module includes an event-analyzing unit, a responsibility-analyzing unit and a service-advising unit. The event-analyzing unit electrically coupled with the detection unit is to receive the abnormal-notification signal so as to base on the abnormal-notification signal to analyze an event type. The responsibility-analyzing unit electrically coupled with the detection unit and the event-analyzing unit further includes a personnel-in-charge lookup table to demonstrate a mapping relationship between the event type and the at least one personnel in charge. The responsibility-analyzing unit is to base on the event type and the personnel-in-charge lookup table to realize the at least one personnel in charge so as to activate the detection unit to transmit the abnormal-notification signal to the communication device held by the at least one personnel in charge. The service-advising unit electrically coupled with the event-analyzing unit has a service-advising lookup table including a mapping relationship between the event type and the at least one service advice. The service-advising unit is to base on the event type and the service-advising lookup table to transmit a service-advising signal representing the at least one service advice to the communication device held by the at least one personnel in charge In one embodiment of the present invention, the motor-fitting database electrically coupled with processing unit is to store the real-time work parameter as a historical work parameter. Also, the play unit is a display screen for displaying a plurality of functional keys. While one of the functional keys is triggered, the application-processing unit is activated to capture the historical work parameter from the motor-fitting database so as to have the display screen to display the historical work parameter. In addition, the motor fitting is at least one of a motor, a switch board and a frequency transformer.

In one embodiment of the present invention, a network transmission module is further included. The network transmission module is communicatively coupled in between with the sensor set and the processing module and is to receive the detection signal. The network transmission module further transmits the detection signal to the processing module, in which the processing module can be a server. The network transmission module includes a gateway and a modem, in which the gateway is communicatively coupled with the sensor set and the modem is communicatively coupled with both the gateway and the server.

Therefore, by providing the system for managing real-time work information of a motor fitting in accordance with the present invention, since the user can directly utilize his/her own communication device to receive the real-time work parameter of the motor fitting and can receive the abnormal-notification signal in a real-time manner while an abnormal situation upon the motor fitting is met, so the user can be anywhere away the motor fitting or the central control room but can still be aware in a real-time manner of the real-time work parameter and the abnormal-notification signal of the motor fitting. Namely, even the user is far away from the motor fitting, he/she can still observe and further manage the motor fitting immediately, and thus the application convenience thereof can be greatly improved.

All these objects are achieved by the system for managing real-time work information of a motor fitting described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a historical work parameter. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since various similar embodiments can be organized for the system for managing real-time work information of a motor fitting in accordance with the present invention, only the following preferred embodiment thereof-among is provided for explaining in details the present invention.

Figure 1:
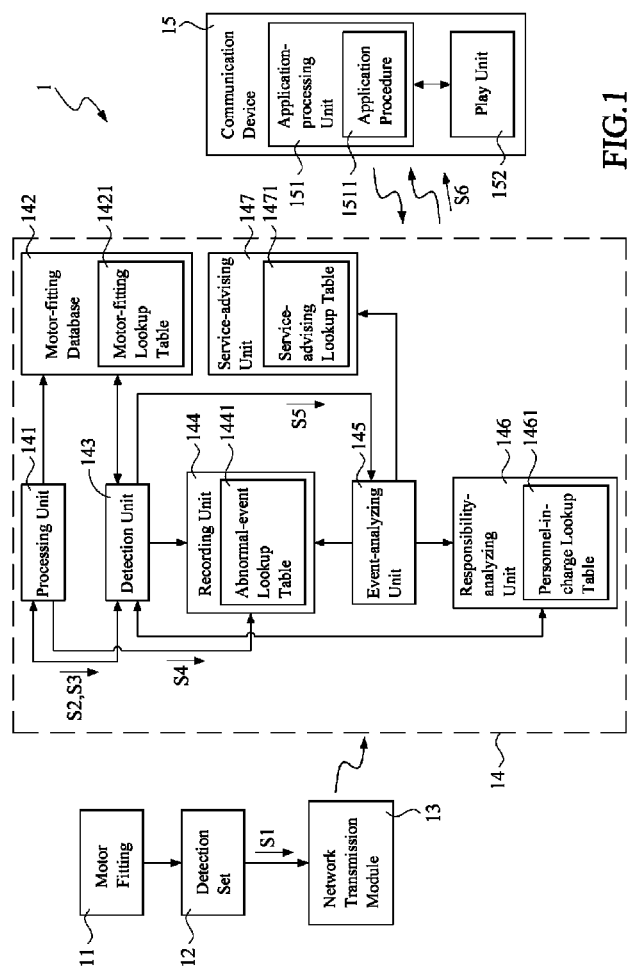
FIG. 1 is a block diagram of a preferred system for managing real-time work information of a motor fitting in accordance with the present invention.
Figure 2:
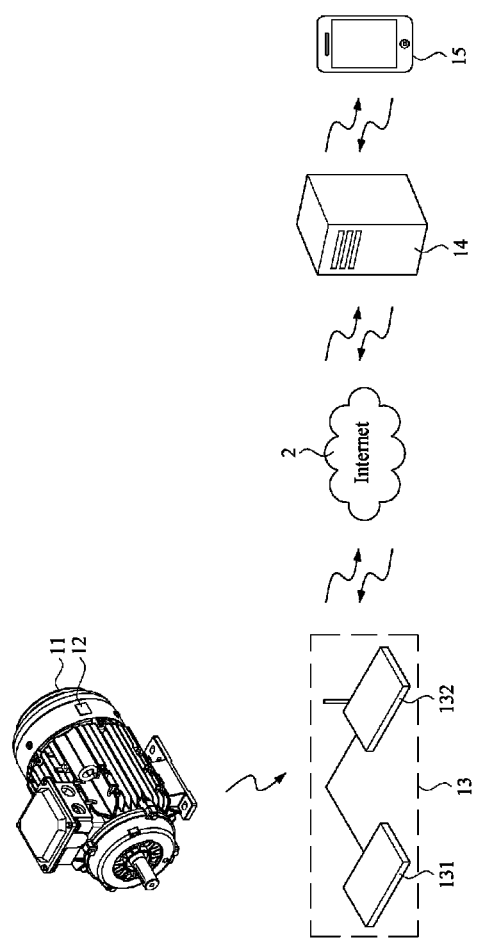
FIG. 2 is a practical setup for FIG. 1.
Figure 3:
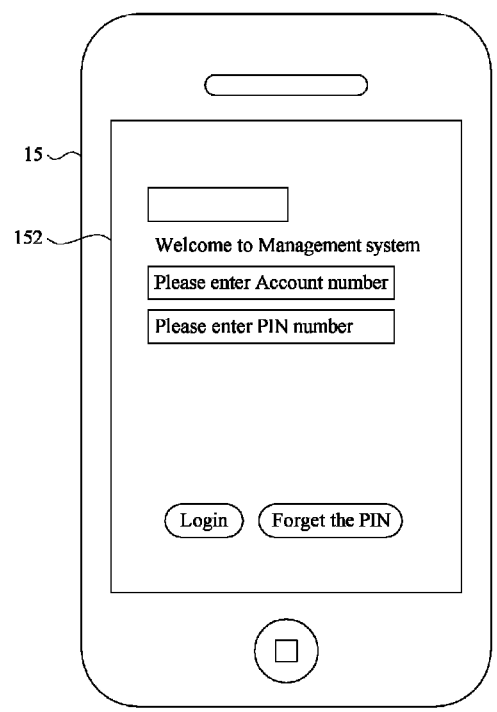
FIG. 3, FIG. 3A and FIG. 3B demonstrate schematically three different states of the display-operational interface displayed on the communication device of FIG. 2.
Figure 3A:
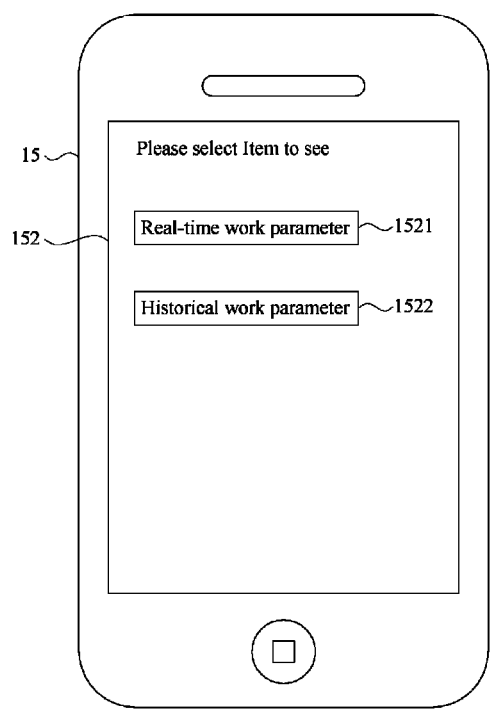
Figure 3B:
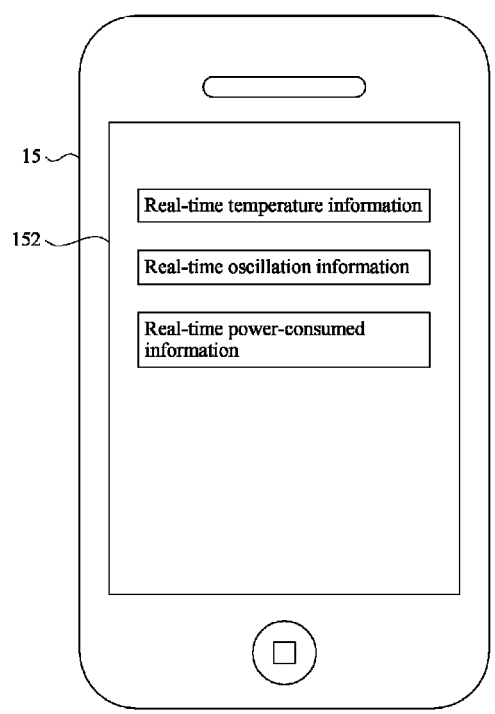
Figure 4:
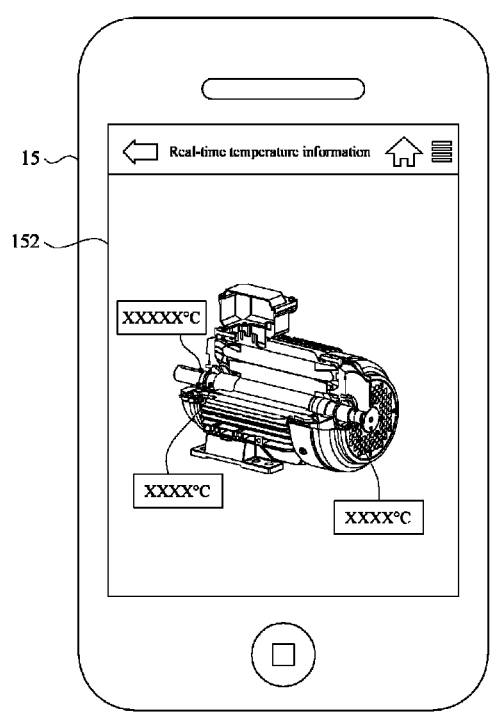
FIG. 4, FIG. 4A and FIG. 4B demonstrate schematically three different states of the real-time work parameter displayed on the communication device of FIG. 2.
Figure 4A:
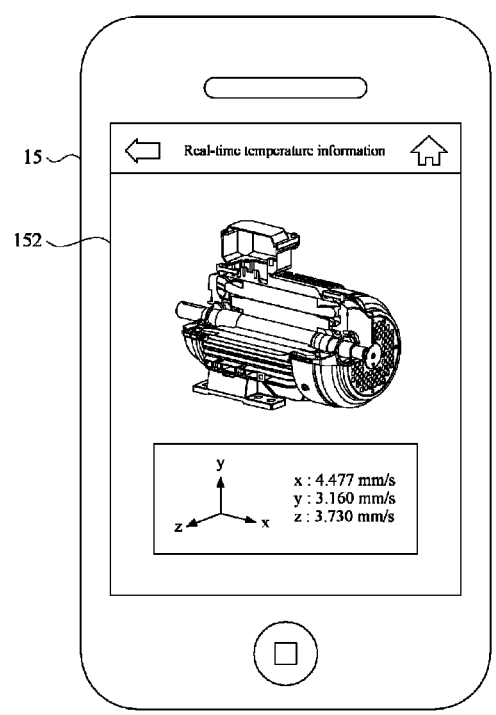
Figure 4B:
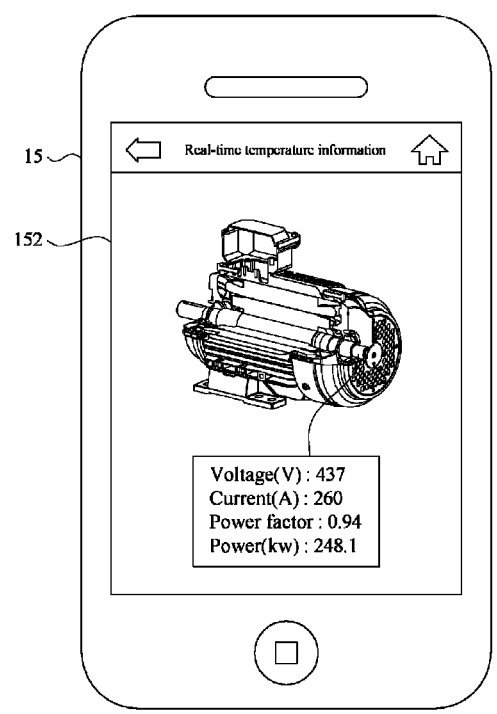
Figure 5:
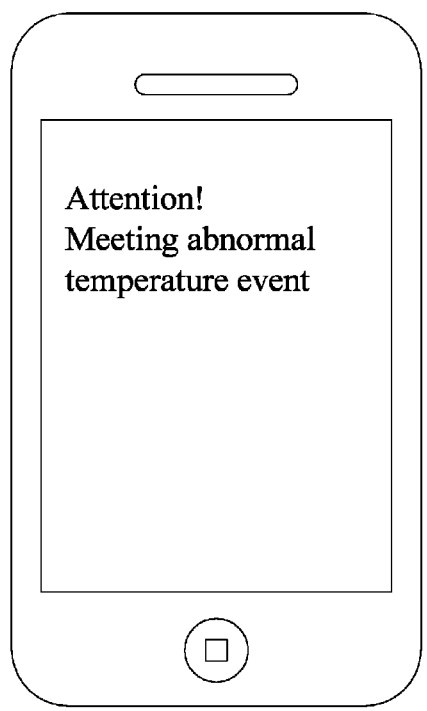
FIG. 5 demonstrates schematically a display of notification information by the play unit on the communication device of FIG. 2.

Refer now to FIG. 1 through FIG. 6B, in which FIG. 1 is a block diagram of a preferred system for managing real-time work information of a motor fitting in accordance with the present invention; FIG. 2 is a practical setup for FIG. 1; FIG. 3, FIG. 3A and FIG. 3B demonstrate schematically three different states of the display-operational interface displayed on the communication device of FIG. 2; FIG. 4, FIG. 4A and FIG. 4B demonstrate schematically three different states of the real-time work parameter displayed on the communication device of FIG. 2; FIG. 5 demonstrates schematically a display of notification information by the play unit on the communication device of FIG. 2; and, FIG. 6, FIG. 6A and FIG. 6B demonstrate schematically three different states of the historical work parameter displayed on the communication device of FIG. 2.

As shown, the preferred system for managing real-time work information of a motor fitting 1 includes at least one motor fitting 11, at least one sensor set 12, a network transmission module 13, a processing module 14 and a communication device 15. The motor fitting 11 can be a motor fitting already in service. Practically, in a factory, there can be a plurality of motor fittings 11 to exist at the same time. Alternatively, plural motor fittings 11 to exist at different factories for the system 1 of the present invention can be also accepted. In the present invention, the motor fitting 11 can be defined as a motor component, a motor part, a motor accessory, and any the like. Practically, the motor component can be the component to assemble the motor, and the motor part can be a part of the motor or the entire motor, the motor accessory can be any peripheral to cooperate with the motor. Namely, the motor fitting 11 can be at least one of a motor, a switch board, a frequency transformer and any the like. In a preferred embodiment as follows, the motor fitting 11 is defined as a motor assembly. However, in some other embodiments, the motor fitting can be a switch board or a frequency transformer.

The sensor set 12 is mounted at the motor fitting 11; for example, the rotor, the stator, the bearing, the coil or the exterior surface. According to the mounting position, the sensor set 12 can be at least one of a temperature sensor, a voltage sensor, a current sensor and an accelerometer.

The network transmission module 13 is communicatively coupled with the sensor set 12 in a wireless manner, a cable manner, or in a dual-mode manner including wireless and cable connections. In the preferred embodiment of the present invention as shown in FIG. 2, the network transmission module 13 applies the wireless communication for external communications. The network transmission module 13 includes a gateway 131 and a modem 132. The gateway 131 is communicatively coupled with the sensor set 12 in a wireless manner. On the other hand, the modem 132 is cabled to the gateway 131 and is wireless communicatively coupled with the internet 2. Though the network transmission module 13 of the preferred embodiment shall include the gateway 131 and the modem 132, yet, in some other embodiments, such a combination for the network transmission module 13 can be replaced with some other devices capable of network communications.

The processing module 14 is communicatively coupled with the sensor set 12. In the preferred embodiment, the processing module 14 can be a server (a distant server or a near-end server, a distant server in this embodiment), which is communicatively coupled with the sensor set 12 via the internet 2 and the network transmission module 13. The processing module 14 includes a processing unit 141, a motor-fitting database 142, a detection unit 143, a recording unit 144, an event-analyzing unit 145, a responsibility-analyzing unit 146 and a service-advising unit 147.

The processing unit 141 communicatively coupled with the network transmission module 13 is thus communicatively coupled with the sensor set 12. The processing unit 141 can be, but not limited to, a central processing unit (CP), a graphics processing unit (GPU) or an accelerated processing unit (APU).

The motor-fitting database 142 is electrically coupled with the processing unit 141; for example, but not limited to, an erasable programmable read only memory (EPROM) or a non-volatile memory (NVRAM). The motor-fitting database 142 has a motor-fitting lookup table 1421, and the motor-fitting lookup table 1421 further includes a mapping relationship between type information of the motor fitting and at least one normal work parameter value of the motor fitting. Namely, the motor-fitting lookup table 1421 resembles to a specs listing of the motor fitting 11. In this embodiment, the type information of the motor fitting is assigned to be the type of the motor fitting 11, and the normal work parameter value of the motor fitting can be assigned to be specific rated value such as a rated current, a rated power, a rated voltage or a rated power factor. Further, the normal work parameter value of the motor fitting can be also defined as a range around the aforesaid rated value. In addition, in some other embodiments, the type information of the motor fitting can be a manufacturer's work number, which is directly to mapped to the normal work parameter value of the motor fitting. For example, the motor-fitting lookup table 1421 can be shown by, but not limited to, Table 1.

TABLE 1

| Type of motor fitting: RK6RGNC | |
|---|---|
| Normal parameter value of current (A) | 97 |
| Normal parameter value of power (kW) | 37 |
| Normal parameter value of voltage (V) | 380 |
| Normal parameter value of power factor | 90 |

The detection unit 143 is electrically coupled with the processing unit 141 and the motor-fitting database 142, and the recording unit 144 is electrically coupled with the processing unit 141 and the detection unit 143, in which the recording unit 144 further has an abnormal-event lookup table 1441. The abnormal-event lookup table 1441 is defined as a mapping relationship including abnormal events, processed events and site information of the motor fitting 11. The formation of the abnormal-event lookup table 1441 would be detailed as follows; by having, but not limited to, Table 1 as a typical example.

TABLE 2

| Site information of the motor fitting | Abnormal event | Processed event |
|---|---|---|
| District XX of Factory XX in Shanghai | Abnormal event in current | Corrected, 2014/05/01 4:00 pm |
| District XX of Factory XX in Taoyuan | Abnormal event in temperature | Corrected, 2014/07/02 1:00 pm |
| District XX of Factory XX in Jungli | Abnormal event in oscillation | Corrected, 2014/11/12 10:00 am |

The event-analyzing unit 145 is electrically coupled with the detection unit 143 and the recording unit 144. The responsibility-analyzing unit 146 electrically coupled with the event-analyzing unit 145 and the detection unit 143 further includes a personnel-in-charge lookup table 1461. The personnel-in-charge lookup table 1461 demonstrates a mapping relationship among event types and at least one personnel in charge. The event type can be an abnormal current, an abnormal temperature, an abnormal oscillation or any the like. The personnel in charge can be directed to the personnel information doe the corresponding personnel in charge (including names as follows, phone numbers, addresses, employee identification numbers, and so on. A typical formulation of the personnel-in-charge lookup table 1461 is shown in, but not limited to, Table 3.

TABLE 3

| Event type | Personnel in charge |
|---|---|
| Abnormal current | Shaumin Wang, Daiwey Liu |
| Abnormal temperature | Chongten Lin, Teintsai Chen |
| Abnormal oscillation | Shaushen Lu, Chonghen Dai |

The service-advising unit 147 electrically coupled with the event-analyzing unit 145 further includes a service-advising lookup table 1471, which demonstrates a mapping relationship among event types and at least one service advice. Similarly, the event type can be an abnormal situation such as an abnormal current, an abnormal temperature, an abnormal oscillation or any the like. The service advice can be, for example but not limited to, a standard operation procedure (SOP) for operating the motor fitting 11 as shown in Table 4.

TABLE 4

| Event type | Service advice |
|---|---|
| Abnormal current | XXXXX |
| Abnormal temperature | XXXXX |
| Abnormal oscillation | XXXXX |

It shall be mentioned that the detection unit 143, the recording unit 144, the event-analyzing unit 145, the responsibility-analyzing unit 146 or the service-advising unit 147 can be a processing unit same as the aforesaid processing unit 141. Preferably, the processing unit 141, the detection unit 143, the recording unit 144, the event-analyzing unit 145, the responsibility-analyzing unit 146 and the service-advising unit 147 can be integrated into, but not limited to, a unique processing unit so that the occupation for these units can be greatly reduced. In addition, the processing module 14 can include an internal transmission module (not shown in the figure) communicatively coupled with the network transmission module 13 and also electrically coupled with the processing unit 141 for data transmission. The transmission module can be a wireless or cable network interface card. However, in some other embodiments, the processing module 14 can be a server or a gateway, and the processing unit 141 of the processing module 14 can be constructed into the gateway while others are constructed into the server. Anyway, near-end or far-end, preferable formulation thereabout shall depend on practical requirements.

In the present invention, the communication device 15 can be one of, but not limited to, a mobile phone, a tablet computer and a notebook computer that is communicatively coupled with the processing module 14, preferably in a wireless connection manner. The communication device 15 further includes an application-processing unit is 151 and a play unit 152. The application-processing unit 151 can be a CPU, a GPU or an APU who has an application procedure 1511. The application procedure 1511 can be an application program (APP). The play unit 152 electrically coupled with application-processing unit 151 can be a speaker, a display screen or an LED. In the preferred embodiment, the display screen is introduced as a typical example. Generally, the personnel in charge or any who is responsible for servicing the motor fitting 11 would hold the specific communication device 15, in which the application procedure 1511 thereof is usually activated through correct login, as shown in FIG. 3 As soon as the application procedure 1511 is posed at a real-time operation state, it becomes the terminate-and-stay resident (TSR) of the communication device 15.

The sensor set 12 located at the motor fitting 11 is to detect real-time work information of the motor fitting 11 so as further to transmit a detection signal S1 representing the corresponding real-time work information. The detection signal Si is then transmitted to the processing unit 141 of the processing module 14 via the network transmission module 13. After the processing unit 141 receives the detection signal S1, the real-time work information is based to analyze the type information of the motor fitting 11, the real-time work parameter and the site information corresponding to the motor fitting 11. Thereby, a first processing signal S2 representing the type information of the motor fitting, a second processing signal S3 representing the real-time work parameter and a third processing signal S4 representing the site information are transmitted; in which the type information of the motor fitting is the type of the motor fitting 11, the real-time work parameter is at least one of a voltage, a current, a temperature, a power and a power factor, and the site information is the location-related information of the motor fitting 11. In addition, generally speaking, the aforesaid real-time work information can include the foregoing three types of information. The processing unit 141 is used to analyze these three types of information. By having the temperature to be the real-time work parameter as an example, the real-time work information can include a resistance value detected by the sensor set 12. The processing unit 141 would then analyze the detected resistance to be realized as a corresponding temperature. The analysis related to the real-time work parameter is matured in the art, and would be omitted herein.

After the detection unit 143 receives the first processing signal S2 and the second processing signal S3, the type information of the motor fitting and the motor-fitting lookup table 1421 are used to determine if the real-time work parameter exceeds the normal work parameter value or range of the motor fitting. If the determination is positive, then an abnormal-notification signal S5 is generated and then transmitted. Practically, in this judgment, in the case that the normal work parameter value of the motor fitting is a fixed range, then an abnormal state is defined as a state that a detected value is either beyond the maximum or below the minimum of the range. In the case that the normal work parameter value of the motor fitting is a rated value, then an abnormal state is defined as a state that a detected value is larger than the rated value.

In addition, while the application procedure 1511 is triggered, the application-processing unit 151 of the communication device 15 would receive the second processing signal S3 in a real-time manner, and, upon receiving the second processing signal S3, the play unit 152 is activated to play the real-time work parameter in an image-playing mode, as shown in FIG. 3 through FIG. 3B. In some other embodiments, an audio-playing mode can be applied individually or in a combination thereof. Triggering of the aforesaid application procedure 1511 is defined as a state that the application procedure 1511 is activated. Alternatively, after entering the operational interface of the application procedure 1511, the play unit 152 would display a plurality of functional keys 1521, 1522 (as shown in FIG. 3A, preferably posterior to a display of types of the motor fitting for selection). After the functional key 1521 is clicked and thus triggered, the play unit 152 would display real-time work parameters such as "Real-time temperature information", "Real-time oscillation information" and "Real-time power-consumed information" as shown in FIG. 3B. Clicking at the "Real-time temperature information" would lead to a result of FIG. 4, clicking at the "Real-time oscillation information" would lead to a result of FIG. 4A, and clicking at the "Real-time power-consumed information" would lead to a result of FIG. 4B.

In addition, after the application procedure 1511 is activated to have the application-processing unit 151 to receive the abnormal-notification signal S5, the play unit 152 is also triggered to display corresponding notification information as shown in FIG. 5. Contents of the notification information can include a type of the abnormal event, the location-related information of the motor fitting, and so on. Further, the notification information can be a message, an email or any the like per a practical requirement.

Preferably, while the detection unit 143 transmits the abnormal-notification signal S5, the recording unit 144 would also record the abnormal event to include the location, the time and the type of the abnormal event. In the present invention, the triggering can be at the timing of receiving the abnormal-notification signal S5, or at a time after the result from the event-analyzing unit 145 is arrived.

Further, after the event-analyzing unit 145 receives the abnormal-notification signal S5, the abnormal-notification signal S5 is used to analyze an event type. Namely, the abnormal-notification signal S5 issued by the detection device 143 and induced by an abnormal situation can include simultaneously information of a type and a classification of the abnormal event. Hence, besides the abnormal current, the abnormal temperature and the abnormal oscillation, the type of the abnormal event can also include a class of abnormality (heavy, medium and light). In meeting different class of the abnormal event, different personnel in charge would be informed.

In the preferred embodiment of the present invention, the responsibility-analyzing unit 146 can analyze and obtain at least one personnel to charge according to the event type realized by the event-analyzing unit 145 and the personnel-in-charge lookup table 1461, such that the detection unit 143 can be triggered to transmit the abnormal-notification signal S5 to the communication device 15 held by at least one personnel in charge. Namely, preferably, while in an abnormal event, the responsibility-analyzing unit 146 would have the detection unit 143 to formulate an abnormal-notification signal S5 to be further transmitted to the specific communication device 15 of the personnel in charge, not to every communication devices 15 in the system. Furthermore, the personnel in charge would base on the notification information provided by the communication device 15 to manage the abnormal event, and then the management-related information would be further transmitted to the recording unit 144 via the application procedure 1511 so as allow a processed event can be booked into the recording unit 144. Therefore, after the recording unit 144 receives the third processing signal S3, the results analyzed by the event-analyzing unit 145, and the processed event, the recording unit 144 can also book the abnormal event, the processed event and the site information into the abnormal-event lookup table 1441 for a future checking by the personnel in charge.

Figure 6:
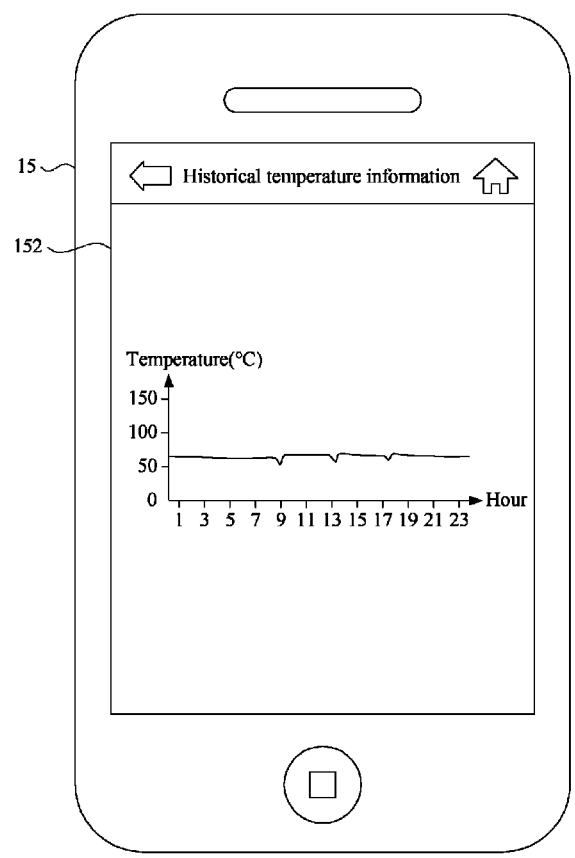
FIG. 6, FIG. 6A and FIG. 6B demonstrate schematically three different states of the historical work parameter displayed on the communication device of FIG. 2.
Figure 6A:
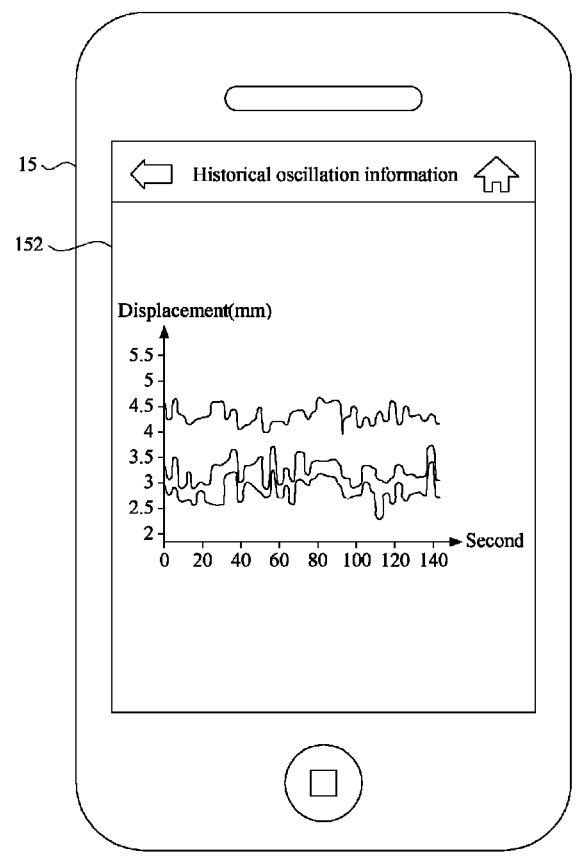
Figure 6B:
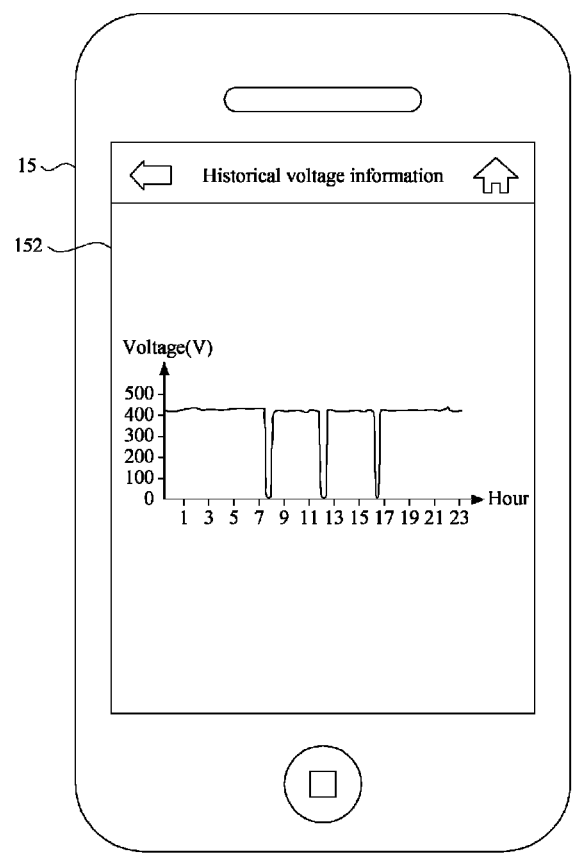

In addition, but preferably, the motor-fitting database 142 can also receive the second processing signal S3 so as to store the real-time work parameter as a corresponding historical work parameter for future checking of the personnel in charge. For example, if any personnel in charge wants to know the historical records, he/she can click the functional keys 1522 "Historical work parameter" of FIG. 3A, then the historical temperature information, the historical oscillation information and historical voltage information (not shown in the figure) can be displayed. The application-processing unit 151 would then be triggered by relevant clicking to capture the historical work parameters in the motor-fitting database 142, so that the play unit 152 would initiate screens for checking the historical work parameters as shown respectively in FIG. 6, FIG. 6A and FIG. 6B. It is obvious that the present invention provides crucial convenience for people to check the critical historical parameters. The aforesaid example is just typical used for explain the present invention, not particularly for limiting the scope of the present invention. It shall be also mentioned that, the unit of time scale in either of FIG. 6, FIG. 6A and FIG. 6B is the hour, yet in some other embodiments the scale can be a year, a month, a day or any period of time per actual requirements. Further, the personnel in charge can also base on the aforesaid historical work parameters to calculate the abnormal frequency of the corresponding motor fitting 11.

In addition, the service-advising unit 147 would base on the event type realized by the event-analyzing unit 145 and the service-advising lookup table 1471 to transmit a service-advising signal S6 standing for the at least one service advice to the specific communication device 15 held by the at least one personnel in charge. That is also to sat that, in the preferred embodiment of the present invention, the communication device 15 of the personnel in charge can receive both the abnormal-notification signal S5 and information related to the service advice. Therefore, the SOP provided by the service advice can be directly applied to manage the abnormal event. Preferably, the personnel in charge can also amend the SOP and then update the amended SOP into the service-advising lookup table 1471 via the service-advising unit 147. Thus, a senior personnel in charge can provide his/her own experiences to update the service-advising lookup table 1471 for people to follow. Further, the personnel in charge can also base on the occurrence frequency of the abnormal event to provide better service advice.

In the preferred embodiment of the present invention, the aforesaid service advice can be a maintenance advice. Practically, that is to say that the maintenance advice can be provided in a cycle of fixed time duration, such as a monthly maintenance advice or a maintenance device per practical requirement. In the present invention, the service-advising unit 147 is electrically coupled with the recording unit 144, in which the recording unit 144 can record the abnormal event, the site information and the processed event in the abnormal-event lookup table 1441, and can further book the occurrence time, the location and the processing time of the abnormal event, such that the service-advising unit 147 can capture the aforesaid service time and service advice from the recording unit 144.

In summary, by providing the system for managing real-time work information of a motor fitting in accordance with the present invention, the user can utilize the communication device to receive the real-time work information of the motor fitting, and can receive the real-time work parameter at each occurrence of the abnormal event. Hence, the real-time work parameter or the abnormal-notification signal can be feasible to the user without him/her to be close to the motor fitting or the central control room. Namely, a distant user can obtain the real-time information in a real-time manner, so that the follow-up management can be provided in time. Therefore, the application convenience can be greatly improved.

While the present invention has been particularly shown and described with reference to a preferred embodiment, it will be understood by those skilled in the art that various changes in form and detail may be without departing from the spirit and scope of the present invention.

What is claimed is:

1. A system for managing real-time work information of a motor fitting, comprising:
    at least one motor fitting;
    at least one sensor set, mounted at the at least one motor fitting to detect real-time work information of the at least one motor fitting so as to transmit a detection signal representing the real-time work information;
    a processing module, communicatively coupled with the sensor set, further including:
        a processing unit for receiving the detection signal being to analyze type information and real-time work information of the at least one motor fitting with respect to the at least one motor fitting and for further transmitting a first processing signal representing the type information and a second processing signal representing the real-time work parameter;
        a motor-fitting database, storing at least one motor-fitting lookup table, the at least one motor-fitting lookup table further including a mapping relationship between the type information and at least one normal work parameter value of the at least one motor fitting;
        a detection unit, electrically coupled with the processing unit and the motor-fitting database to receive the first processing signal and the second processing signal so as to base on the type information and the motor-fitting lookup table to judge if the real-time work parameter is fallen out of the at least one normal work parameter value of the at least one motor fitting and further to transmit an abnormal-notification signal upon meeting a situation that the real-time work parameter is fallen out of the at least one normal work parameter value of the at least one motor fitting;

an event-analyzing unit, electrically coupled with the detection unit to receive the abnormal-notification signal so as to base on the abnormal-notification signal to analyze an event type; and a responsibility-analyzing unit, electrically coupled with the detection unit and the event-analyzing unit, further having a personnel-in-charge lookup table, the personnel-in-charge lookup table including a mapping relationship between the event type and at least one personnel in charge; and a communication device, communicatively coupled with the processing module, further including:

an application-processing unit, further having an application procedure; and a play unit, electrically coupled with the application-processing unit;

wherein after the application procedure triggers the application-processing unit to receive the second processing signal, the play unit is thus activated to play the real-time work parameter;

wherein after the application procedure triggers the application-processing unit to receive the abnormal-notification signal, the play unit is thus activated to play notification information; and wherein the responsibility-analyzing unit is to base on the event type and the personnel-in-charge lookup table to analyze the at least one personnel in charge so as to activate the detection unit to transmit the abnormal-notification signal to the communication device held by the at least one personnel in charge.

2. The system for managing real-time work information of a motor fitting of claim 1, wherein the real-time work parameter is at least one of a voltage, a current, a temperature, a power and a power factor.

3. The system for managing real-time work information of a motor fitting of claim 1, wherein the processing module includes a recording unit electrically coupled with the detection unit for recording an abnormal event while the detection unit transmits the abnormal-notification signal, the recording unit recording a processed event while a personnel in charge bases on the notification information generated by the communication device to manage the abnormal event.

4. The system for managing real-time work information of a motor fitting of claim 3, wherein the processing unit is electrically coupled with the recording unit and bases on site information realized by the real-time work information with respect to the at least one motor fitting to have the recording unit to record the abnormal event, the processed event and the site information into an abnormal-event lookup table.

5. The system for managing real-time work information of a motor fitting of claim 1, wherein the type information of the motor fitting is at least one of a rated current, a rated power, a rated voltage and a rated power factor.

6. The system for managing real-time work information of a motor fitting of claim 1, further including a network transmission module communicatively coupled in between with the sensor set and the processing module so as to receive the detection signal and to further transmit the detection signal transmit to the processing module.

7. The system for managing real-time work information of a motor fitting of claim 6, wherein the processing module is a server, and the network transmission module includes a gateway and a modem, the gateway communicatively coupled with the sensor set, the modem communicatively coupled with both the gateway and the server.

8. The system for managing real-time work information of a motor fitting of claim 1, wherein the processing module is one of a server and a gateway.

9. The system for managing real-time work information of a motor fitting of claim 1, wherein the communication device is one of a mobile phone, a tablet computer and a notebook computer.

10. The system for managing real-time work information of a motor fitting of claim 1, wherein the processing module includes a service-advising unit electrically coupled with the event-analyzing unit and having a service-advising lookup table, the service-advising lookup table including a mapping relationship between the event type and the at least one service advice, the service-advising unit being to base on the event type and the service-advising lookup table to transmit a service-advising signal representing the at least one service advice to the communication device held by the at least one personnel in charge.

11. The system for managing real-time work information of a motor fitting of claim 1, wherein the play unit includes one of an audio-playing mode and a image-playing mode for playing the notification information.

12. The system for managing real-time work information of a motor fitting of claim 1, wherein the motor-fitting database is electrically coupled with the processing unit so as to store the real-time work parameter as a historical work parameter.

13. The system for managing real-time work information of a motor fitting of claim 12, wherein the play unit is a display screen for displaying a plurality of functional keys, wherein, when one of the functional keys is triggered, the application-processing unit is to capture the historical work parameter from the motor-fitting database so as to have the display screen to display the historical work parameter.

14. The system for managing real-time work information of a motor fitting of claim 1, wherein the at least one motor fitting is at least one of a motor, a switch board and a frequency transformer.

* * * * *